(12) United States Patent
Yoo et al.

(10) Patent No.: US 12,094,655 B2
(45) Date of Patent: Sep. 17, 2024

(54) ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Won Hee Yoo, Suwon-si (KR); Sang Moon Lee, Suwon-si (KR); Eun Kwang Lee, Suwon-si (KR); Jae Young Na, Suwon-si (KR); Han Seong Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 114 days.

(21) Appl. No.: 17/469,125

(22) Filed: Sep. 8, 2021

(65) Prior Publication Data

US 2022/0157526 A1 May 19, 2022

(30) Foreign Application Priority Data

Nov. 16, 2020 (KR) .................. 10-2020-0152643

(51) Int. Cl.
*H01G 4/008* (2006.01)
*H01G 4/30* (2006.01)

(52) U.S. Cl.
CPC ............ *H01G 4/0085* (2013.01); *H01G 4/30* (2013.01)

(58) Field of Classification Search
CPC ........ H01G 4/008; H01G 4/0085; H01G 4/30; H01G 4/228; H10G 4/0085

USPC ... 361/301.4, 321.1, 306.3, 321.3, 303, 301, 361/4

See application file for complete search history.

(56) References Cited

U.S. PATENT DOCUMENTS

| | | | | |
|---|---|---|---|---|
| 5,712,758 A * | 1/1998 | Amano | ............... | H01G 4/2325 361/306.3 |
| 5,835,339 A * | 11/1998 | Sakamoto | ............... | H01G 4/30 361/321.5 |
| 9,030,800 B2 * | 5/2015 | Namikawa | ............. | H01G 4/232 361/312 |

(Continued)

FOREIGN PATENT DOCUMENTS

JP 5939360 B2 6/2016
KR 10-2016-0135970 A 11/2016

(Continued)

OTHER PUBLICATIONS

Junwei Han et al., "Caging tin oxide in three-dimensional graphene networks for superior volumetric lithium storage", Nature Communications, 2018, vol. 9:402, pp. 1-9.

(Continued)

*Primary Examiner* — Arun Ramaswamy
(74) *Attorney, Agent, or Firm* — MORGAN, LEWIS & BOCKIUS LLP

(57) ABSTRACT

An electronic component includes a plurality of dielectric layers; and a plurality of first internal electrodes and a plurality of second internal electrodes alternately disposed with a corresponding dielectric layer interposed therebetween. One of the plurality of first internal electrodes includes a metal layer containing Ni and Sn, a first graphene layer disposed on a lower surface of the metal layer, and a second graphene layer disposed on an upper surface of the metal layer.

19 Claims, 13 Drawing Sheets

(56) References Cited

U.S. PATENT DOCUMENTS

| | | | | |
|---|---|---|---|---|
| 2013/0038982 | A1* | 2/2013 | Lee | H01G 4/005 |
| | | | | 427/79 |
| 2013/0050901 | A1* | 2/2013 | Lee | H01G 4/12 |
| | | | | 977/734 |
| 2014/0138138 | A1* | 5/2014 | Park | H01G 2/06 |
| | | | | 174/260 |
| 2016/0155571 | A1* | 6/2016 | Doi | H01G 4/12 |
| | | | | 156/89.16 |
| 2016/0358713 | A1* | 12/2016 | Doi | H01G 4/0085 |
| 2017/0365409 | A1* | 12/2017 | Morita | H01G 4/0085 |
| 2018/0144863 | A1* | 5/2018 | Kim | C01B 32/23 |
| 2019/0103224 | A1 | 4/2019 | Han et al. | |
| 2019/0333699 | A1 | 10/2019 | Lee et al. | |
| 2021/0020363 | A1 | 1/2021 | Song et al. | |

FOREIGN PATENT DOCUMENTS

| | | |
|---|---|---|
| KR | 10-1922864 B1 | 11/2018 |
| KR | 10-2019-0038237 A | 4/2019 |
| KR | 10-2019-0116133 A | 10/2019 |
| KR | 10-2019-0125876 A | 11/2019 |
| KR | 10-2020-0018554 A | 2/2020 |

OTHER PUBLICATIONS

Xiaoxia Zuo et al., "Tin-based materials supported on nitrogen-doped reduced graphene oxide towards their 2 application in lithium-ion batteries", Royal Society of Chemistry, 2017, vol. 7, pp. 53126-53134.

* cited by examiner

ELECTRONIC COMPONENT AND METHOD OF MANUFACTURING THE SAME

CROSS-REFERENCE TO RELATED APPLICATION(S)

This application claims benefit of priority to Korean Patent Application No. 10-2020-0152643 filed on Nov. 16, 2020 in the Korean Intellectual Property Office, the disclosure of which is incorporated herein by reference in its entirety.

TECHNICAL FIELD

The present disclosure relates to an electronic component and a method of manufacturing the same.

BACKGROUND

A multilayer capacitor such as a multilayer ceramic capacitor (MLCC) may include a plurality of dielectric layers and a plurality of internal electrodes alternately disposed with the dielectric layers interposed therebetween.

SUMMARY

According to an aspect of the present disclosure, Sn may be used as an additive to improve properties of an internal electrode. Sn added to the internal electrode may improve reliability (e.g., high temperature load lifespan and connectivity of the internal electrode). However, Sn may diffuse from the internal electrode to the dielectric layer. Sn diffused to the dielectric layer may react with oxygen included in the dielectric layer, such that capacitance may be reduced.

An aspect of the present disclosure is to provide an electronic component having improved reliability.

Another aspect of the present disclosure is to provide a method of manufacturing an electronic component having improved reliability.

According to an aspect of the present disclosure, an electronic component includes a plurality of dielectric layers; and a plurality of first internal electrodes and a plurality of second internal electrodes alternately disposed with a corresponding dielectric layer interposed therebetween. One of the plurality of first internal electrodes includes a metal layer containing Ni and Sn, a first graphene layer disposed on a lower surface of the metal layer, and a second graphene layer disposed on an upper surface of the metal layer.

According to another aspect of the present disclosure, an electronic component includes a body including a plurality of dielectric layers, and a plurality of first internal electrodes and a plurality of second internal electrodes alternately disposed with a corresponding dielectric layer interposed therebetween; a first external electrode in contact with the corresponding plurality of first internal electrodes through one surface of the body; and a second external electrode in contact with the corresponding plurality of second internal electrodes through the other surface of the body. One of the plurality of first internal electrodes includes a metal layer, a first graphene layer disposed on a lower surface of the metal layer, and a second graphene layer disposed on an upper surface of the metal layer. The first graphene layer or the second graphene layer protrudes further than the dielectric layer on one surface of the body.

According to another aspect of the present disclosure, a method of manufacturing an electronic component includes forming a non-sintered body including a plurality of non-sintered dielectric layers and a plurality of non-sintered internal electrodes, and forming a sintered body by baking the non-sintered body. The forming a non-sintered body includes forming a first graphene on the green sheet, applying a paste including Ni and Sn on the first graphene, and forming a second graphene on the paste.

BRIEF DESCRIPTION OF DRAWINGS

The above and other aspects, features, and advantages of the present disclosure will be more clearly understood from the following detailed description, taken in conjunction with the accompanying lead-outs, in which.

DETAILED DESCRIPTION

Figure 1:
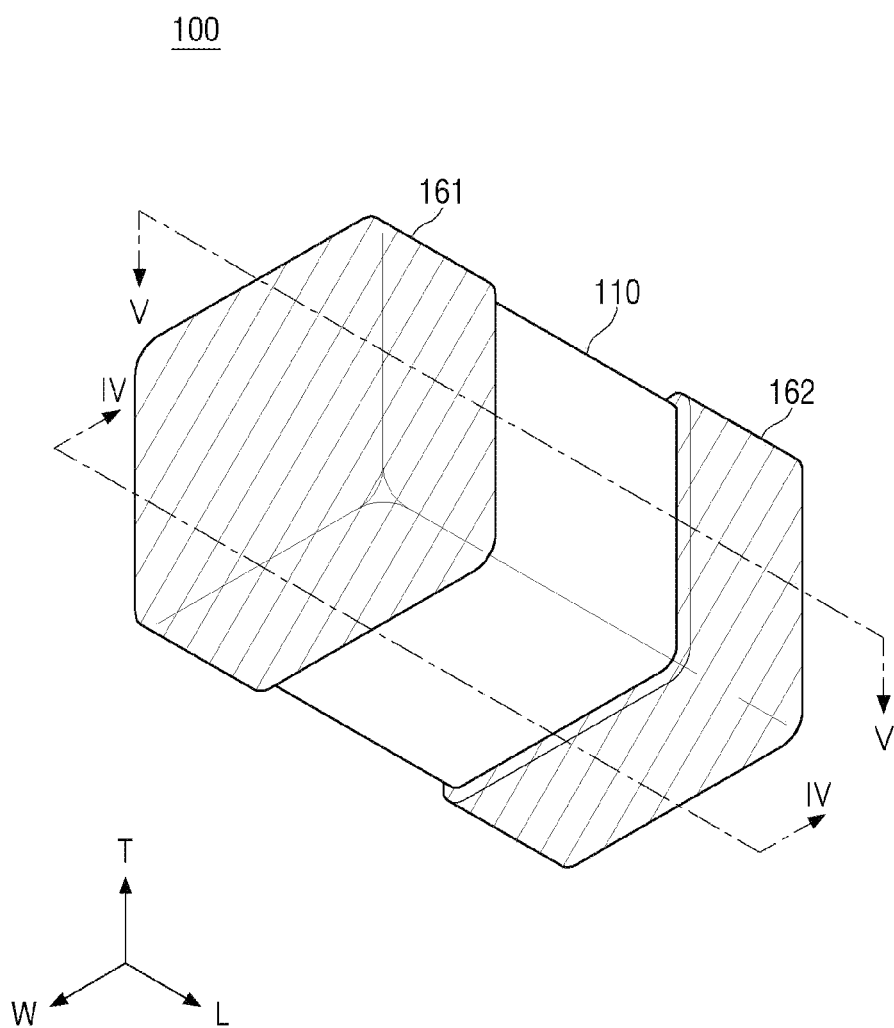
FIG. 1 is a perspective diagram illustrating an electronic component according to an example embodiment of the present disclosure.

In the description below, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clarity of description, and elements indicated by the same reference numeral are the same elements in the drawings.

The configuration in which an element or layer is referred to as being disposed "on" another element or layer may include the configuration in which another layer or another element is interposed therebetween, as well as being directly disposed on another element or layer. The configuration in which an element is referred to as being "directly on" indicates that no other element or layer is interposed therebetween.

The spatially relative terms "below," "beneath," "lower," "above," and "upper," spatially relative terms, may be used to easily describe correlation between elements. Spatially relative terms may include different directions of an element while being used or operating in addition to the directions illustrated in the drawings. For example, when an element illustrated in the drawings is upside down, an element described as "below" or "beneath" another element may be placed "above" another element. Accordingly, an example term "below" may include both directions of below and above. An element may be oriented in other directions, and accordingly, spatially relative terms may be interpreted according to the orientation.

The terms "first," "second," and the like may be used to describe various elements, and/or sections, elements, and/or sections are not limited to the terms. These terms are only used to distinguish one element or section from another element or section. Therefore, a first element, a first element, or a first section mentioned below may be a second element, a second element, or a second section in example embodiments.

Figure 2:
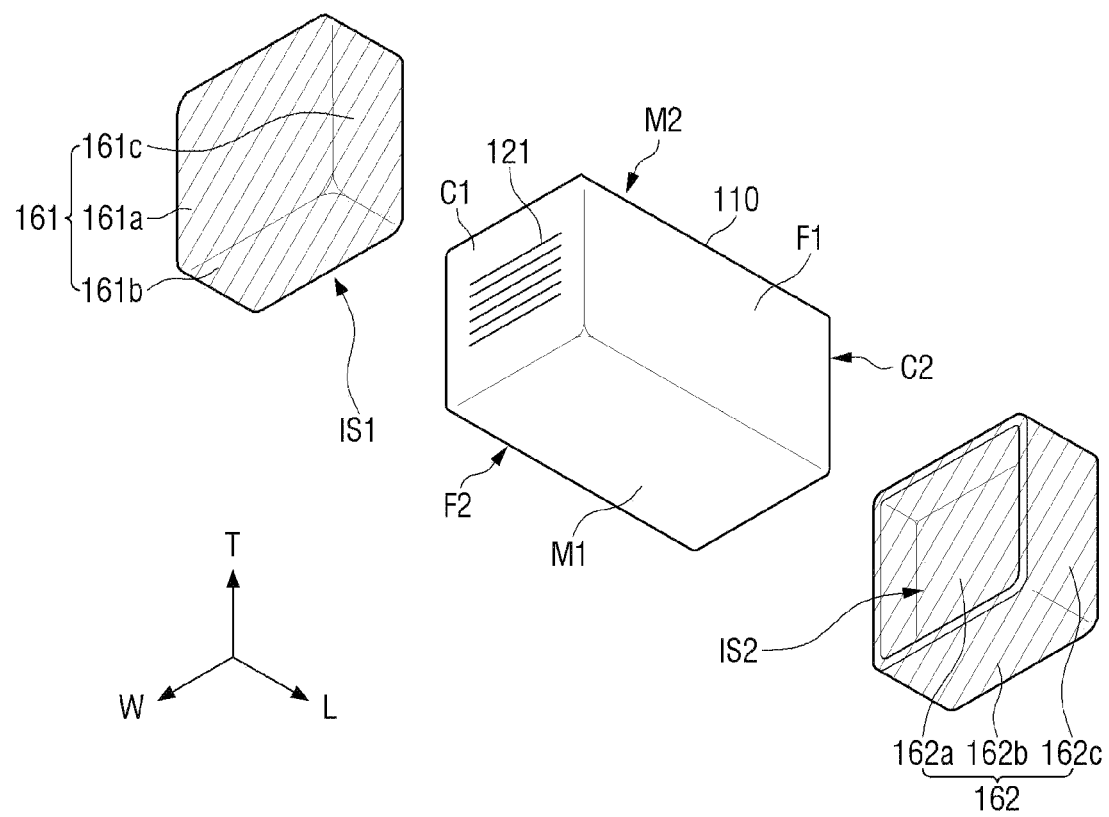
FIG. 2 is an exploded perspective diagram illustrating the electronic component in FIG. 1.
Figure 3:
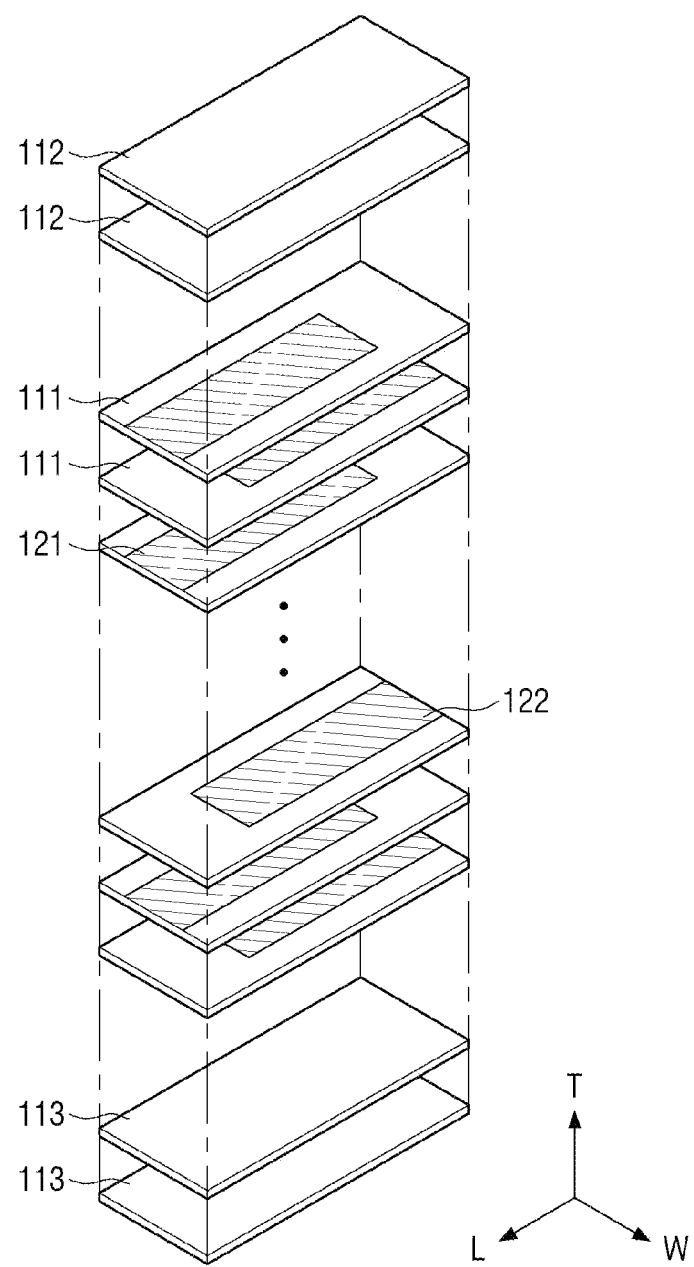
FIG. 3 is an exploded perspective diagram illustrating a body of the electronic component in FIG. 1.
Figure 4:
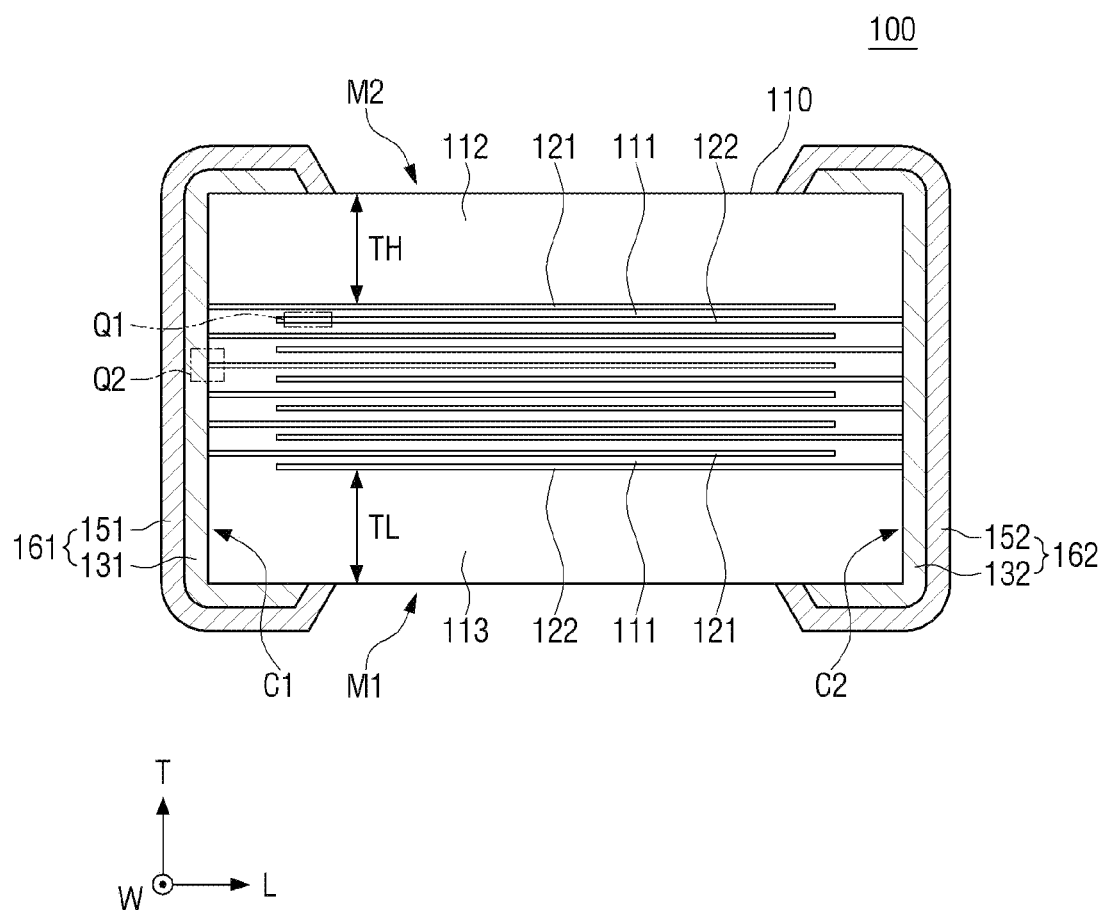
FIG. 4 is a cross-sectional diagram taken along line IV-IV in FIG. 1.
Figure 5:
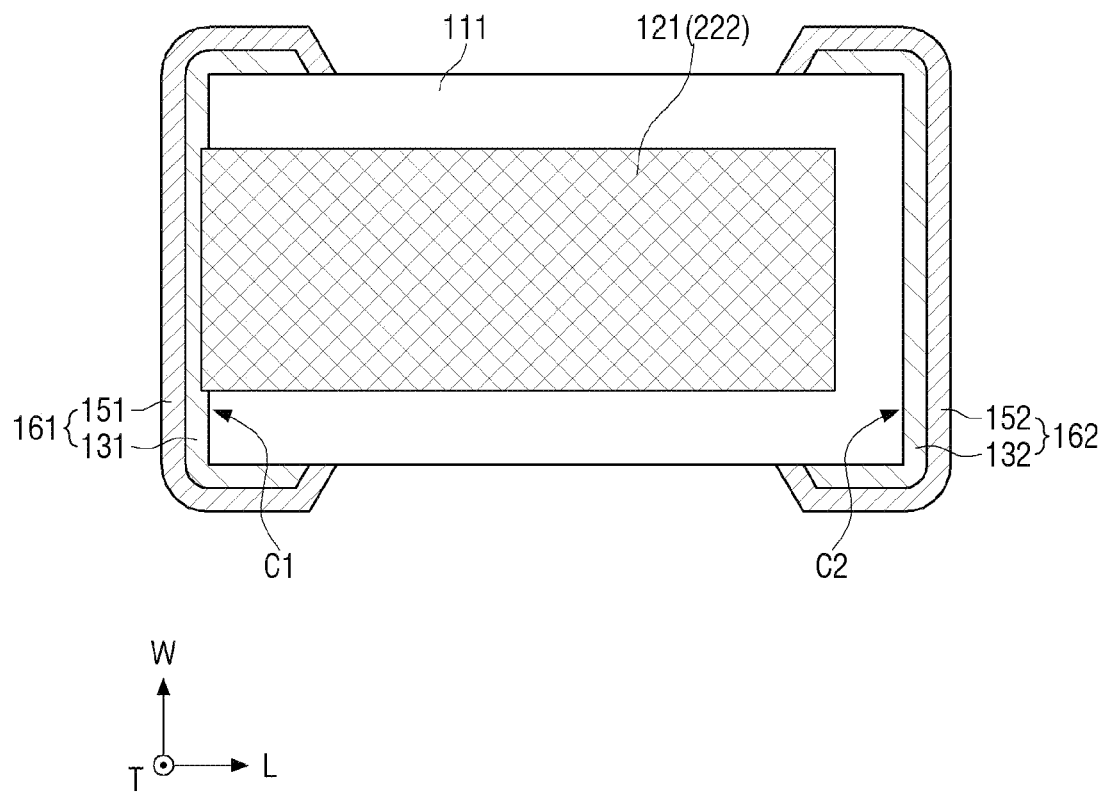
FIG. 5 is a cross-sectional diagram taken along V-V in FIG. 1.

FIG. 1 is a perspective diagram illustrating an electronic component according to an example embodiment. FIG. 2 is an exploded perspective diagram illustrating the electronic component in FIG. 1. FIG. 3 is an exploded perspective diagram illustrating a body of the electronic component in FIG. 1. FIG. 4 is a cross-sectional diagram taken along line IV-IV in FIG. 1. FIG. 4 is a cross-sectional diagram taken V-V in FIG. 1. FIG. 4 is a LT (length-thickness) cross-sectional diagram illustrating the electronic component in FIG. 1. FIG. 5 is a LW (length-width) cross-sectional diagram illustrating the electronic component in FIG. 1.

Referring to FIGS. 1, 2 and 4, an electronic component 100 in an example embodiment may include a body (or a ceramic body) 110, a first external electrode 161, and a second external electrode 162.

The body 110 may have, for example, a hexahedral shape. For example, the body 110 may include six surfaces M1, M2, F1, F2, C1, and C2, as illustrated in FIG. 2. The first and second surfaces M1 and M2 may oppose each other in a third direction T (or in a thickness direction of the body 110). When the electronic component 100 is mounted on a substrate, the first surface M1 or the second surface M2 may be a surface mounted on the substrate (a mounting surface). The third and fourth surfaces F1 and F2 may oppose each other in a second direction W (or in a width direction of the body 110). The third and fourth surfaces F1 and F2 may be connected to the first and second surfaces M1 and M2. The fifth and sixth surfaces C1 and C2 may oppose each other in a first direction L (or in a length direction of the body 110). The fifth and sixth surfaces C1 and C2 may be connected to the first surface M1, the second surface M2, the third surface F1, and the fourth surface F2.

As illustrated in FIG. 3, the body 110 may include a plurality of dielectric layers 111, a plurality of first internal electrodes 121, and a plurality of second internal electrodes 122. In other words, a plurality of dielectric layers 111 may be laminated, and a plurality of first internal electrodes 121 and a plurality of second internal electrodes 122 may be alternately disposed with the dielectric layer 111 interposed therebetween.

The plurality of dielectric layers 111 may be in a sintered state, and may be integrated such that boundaries between adjacent layers may not be distinct.

The dielectric layer 111 may include a ceramic material having a high dielectric constant, and may include, for example, barium titanate ($BaTiO_3$) powder or strontium titanate ($SrTiO_3$) powder, but an example embodiment thereof is not limited thereto. In other words, any material which may obtain sufficient electrostatic capacitance may be used. Also, a ceramic additive, an organic solvent, an organic binder, a plasticizer, a binder, and a dispersant may be selectively further added to the dielectric layer 111 along with the ceramic powder. Ceramic additives may include transition metal oxides or carbides, rare earth elements, magnesium (Mg) or aluminum (Al), but an example of the ceramic additives are not limited thereto.

The plurality of first internal electrodes 121 may overlap the plurality of second internal electrodes 122 in the third direction T (or in the thickness direction of the body 110), and an area of overlap may be related to the formation of capacitance of the capacitor.

The first internal electrode 121 and the second internal electrode 122 may include nickel (Ni) as a main component, and may include an additive as below.

As an additive, to improve reliability of the first and second internal electrodes 121 and 122, at least one material selected from a group including Sn, Cu, Ag, Pb, Pt, Rh, Ir, Ru, Os, In, Ga, Zn, Bi, and Pb may be used. To increase conductivity of the internal electrodes 121 and 122 by reducing the formation of nickel oxide (NiO), at least one material selected from a group including Li, Na, and K may be used. Also, to uniformly form a composition of an interfacial surface of the internal electrodes 121 and 122, at least one material selected from a group including Ba, Mg, Dy, and Ti may be used.

In the description below, an example in which Sn is used as an additive for the internal electrodes 121 and 122 in an electronic component in example embodiments will be mainly described.

Also, the internal electrodes 121 and 122 may further include graphene. Graphene may contribute to securing a target capacitance by improving connectivity of the internal electrodes 121 and 122, and may improve conductivity of the internal electrodes 121 and 122.

As illustrated in FIG. 4, the plurality of first internal electrodes 121 may be exposed to the fifth surface C1 and may be electrically connected to the first external electrode 161. The plurality of second internal electrodes 122 may be exposed to the sixth surface C2 and may be electrically connected to the second external electrode 162. When a voltage is applied to the first and second external electrodes 161 and 162, electrical charges may be accumulated between the first and second internal electrodes 121 and 122 opposing each other.

The body 110 may further include a lower cover layer 113 disposed below a lowermost internal electrode among the plurality of first internal electrodes 121 and the plurality of second internal electrodes 122. Also, the body 110 may further include an upper cover layer 112 disposed on an uppermost internal electrode among the plurality of first internal electrodes 121 and the plurality of second internal electrodes 122. The lower cover layer 113 and the upper cover layer 112 may be sintered together with the plurality of dielectric layers 111, and may be integrated such that a boundary between adjacent layers may not be distinct.

The lower cover layer 113 and the upper cover layer 112 may be formed by laminating a single dielectric layer or two or more dielectric layers in the third direction T (e.g., in the thickness direction of the body 110). The lower cover layer 113 and the upper cover layer 112 may contribute to preventing damage to the first internal electrode 121 and the second internal electrode 122 from physical/chemical stress. Also, to remove mounting directivity, a thickness TL of the lower cover layer 113 and a thickness TH of the upper cover layer 112 may be configured to be the same, but an example embodiment thereof is not limited thereto. The lower cover layer 113 or the upper cover layer 112 may have the same material and the same configuration as those of the dielectric layer 111, but an example embodiment thereof is not limited thereto.

The shape and the dimensions of the body 110, the number of laminates of the dielectric layer 111, the number of laminates of the first internal electrode 121/the second internal electrode 122, the thicknesses TL and TH of the lower/upper cover layers 113 and 112 may be varied, and example embodiments thereof are not limited thereto.

Referring back to FIGS. 1, 2, and 4, the first external electrode 161 may include a first connection portion 161a, a first mounting portion 161b, and a first side portion 161c. The first connection portion 161a may be disposed on the fifth surface C1 of the body 110 and may be connected to the plurality of first internal electrodes 121 exposed to the fifth surface C1. The first mounting portion 161b may extend from the first connection portion 161a to the first surface M1 and the second surface M2 of the body 110. The first side portion 161c may extend from the first connection portion 161a to the third surface F1 and the fourth surface F2 of the body 110. In other words, the first mounting portion 161b may be parallel to a plane formed by the first internal electrode 121, and the first side portion 161c may be perpendicular to a plane formed by the first internal electrode 121.

The first mounting portion 161b disposed on the first surface M1 of the body 110 and the first mounting portion 161b disposed on the second surface M2 of the body 110 may be symmetrical to each other in the third direction T around the body 110. For example, a length of the first mounting portion 161b disposed on the first surface M1 of the body 110 in the first direction L (or the second direction W) may be the same as a length of the first mounting portion 161b disposed on the second surface M2 of the body 110 in the first direction L (or the second direction W).

Similarly, the first side portion 161c disposed on the third surface F1 of the body 110 and the first side portion 161c disposed on the fourth surface F2 of the body 110 may be symmetrical to each other in the second direction W around the body 110. In other words, a length of the first side portion 161c disposed on the third surface F1 of the body 110 in the first direction L (or the third direction T) may be the same as a length of the first side portions 161c disposed on the fourth surface F2 of the body 110 in the first direction L (or the third direction T).

Similarly, the second external electrode 162 may include a second connection portion 162a, a second mounting portion 162b, and a second side portion 162c. The second connection portion 162a may be disposed on the sixth surface C2 of the body 110 and may be connected to the plurality of second internal electrodes 122 exposed to the sixth surface C2. The second mounting portion 162b may extend from the second connection portion 162a to the first surface M1 and the second surface M2 of the body 110. The second side portion 162c may extend from the second connection portion 162a to the third surface F1 and the fourth surface F2 of the body 110. In other words, the second mounting portion 162b may be parallel to a plane formed by the second internal electrode 122, and the second side portion 162c may be perpendicular to a plane formed by the second internal electrode 122.

The second mounting portion 162b disposed on the first surface M1 of the body 110 and the second mounting portion 162b disposed on the second surface M2 of the body 110 may be symmetrical to each other in the third direction T. The second side portion 162c disposed on the third surface F1 of the body 110 and the second side portion 162c disposed on the fourth surface F2 of the body 110 may be symmetrical to each other in the second direction W.

As described above, the first mounting portion 161b/the second mounting portion 162b formed on the first surface M1 of the body 110 may be symmetrical to the first mounting portion 161b/the second mounting portion 162b formed on the second surface M2 of the body 110, and the thickness TL of the lower cover layer 113 and the thickness TH of the upper cover layer 112 may be configured to be the same. Accordingly, when the electronic component 100 is mounted on a substrate, the mounting directivity may be eliminated. In other words, the first surface M1 of the body 110 may be mounted to oppose the substrate, or the second surface M2 of the body 110 may be mounted to oppose the substrate.

The first connection portion 161a, the first mounting portion 161b, and the first side portion 161c of the first external electrode 161 may be formed by the same process (or a single process), and thicknesses of the first connection portion 161a, the first mounting portion 161b, and the first side portion 161c may be substantially the same. The thicknesses of the first connection portion 161a, the first mounting portion 161b, and the first side portion 161c refer to an average thickness. The expression "the thicknesses may be the same" may indicate an example in which the thicknesses may be completely the same, and also an example in which the thicknesses may be slightly different due to a process error.

The first connection portion 161a and the first side portion 161c may be integrally connected to each other. The first connection portion 161a may be directly connected to the first side portion 161c without a medium. Similarly, the first connecting portion 161a and the first mounting portion 161b may be integrally connected to each other, and the first side portion 161c and the first mounting portion 161b may be integrally connected to each other. Alternatively, at least two of the first connection portion 161a, the first mounting portion 161b, and the first side portion 161c may be directly in contact with each other.

Similarly, the thicknesses of the second connection portion 162a, the second mounting portion 162b, and the second side portion 162c of the second external electrode 162 may be substantially the same. Also, at least two of the second connection portion 162a, the second mounting portion 162b, and the second side portion 162c may be integrally connected to each other. Alternatively, at least two of the second connection portion 162a, the second mounting portion 162b, and the second side portion 162c may be directly in contact with each other.

One end of the body 110 may be disposed in the first internal space IS1, and the other end of the body 110 may be disposed in the second internal space IS2.

The first external electrode 161 may define the first internal space IS1. The first internal space IS1 may be determined by the first connection portion 161a, and the first mounting portion 161b and the first side portion 161c bent from the first connection portion 161a. A space surrounded by the first connection portion 161a, the first mounting portion 161b, and the first side portion 161c may be configured as the first internal space IS1. Specifically, the first connection portion 161a may have a rectangular shape, and the first mounting portion 161b/the first side portion 161c may be perpendicularly bent from respective sides of the first connection portion 161a having a rectangular shape and may extend toward the second external electrode 162.

The second external electrode 162 may define the second internal space IS2. The second internal space IS2 may be determined by the second connection portion 162a and the second mounting portion 162b and the second side portion 162c bent from the second connection portion 162a. A space surrounded by the second connection portion 162a, the second mounting portion 162b, and the second side portion 162c may be configured as the second internal space IS2. Specifically, the second connection portion 162a may have a rectangular shape, and the second mounting portion 162b/ the second side portion 162c may be perpendicularly bent from respective sides of the second connection portion 162a having a rectangular shape and may extend toward the first external electrode 161.

Also, the first external electrode 161 and the second external electrode 162 may be configured to be symmetrical around a central portion of the body 110.

For example, the first mounting portion 161b of the first external electrode 161 disposed on the first surface M1 of the body 110 and the second mounting portion 162b of the second external electrode 162 disposed on the first surface M1 of the body 110 may be symmetrical to each other in the first direction L around the body 110. Also, the first side portion 161c of the first external electrode 161 disposed on the third surface F1 of the body 110 and the second side portion 162c of the second external electrode 162 disposed on the third surface F1 of the body 110 may be symmetrical to each other in the first direction L around the body 110. Also, the first connection portion 161a of the first external electrode 161 disposed on the fifth surface C1 of the body 110 and the second connection portion 162a of the second external electrode 162 disposed on the sixth surface C2 of the body 110 may be symmetrical to each other in the first direction L around the body 110.

Referring to FIGS. 4 and 5, the first external electrode 161 may include a first electrode layer 131 and a first plating layer 151 laminated in order.

The first electrode layer 131 may include a conductive metal, such as, for example, at least one material among copper (Cu), nickel (Ni), gold (Au), silver (Ag), platinum (Pt), and palladium (Pd) or alloys thereof, but an example embodiment thereof is not limited thereto. Also, the first electrode layer 131 may include glass as an auxiliary material. The conductive metal may ensure chip sealing properties and electrical connectivity with a chip, and glass may fill an empty space when a metal is sintered and reduced, and may also provide a bonding force between the first external electrode 161 and the body 110.

The first plating layer 151 may be configured as laminated nickel (Ni)/tin (Sn) plating layers or laminated nickel (Ni)/ gold (Au) plating layers, but an example embodiment thereof is not limited thereto. The first plating layer 151 may improve contact properties with solder when being mounted on a substrate.

The second external electrode 162 may also include a second electrode layer 132 and a second plating layer 152 laminated in order. The second electrode layer 132 may be formed of substantially the same material and the same structure as those of the first electrode layer 131, and the second plating layer 152 may be formed of substantially the same material and the same structure as those of the first plating layer 151.

Referring to FIG. 5, the first internal electrode 121 (the second graphene layer 222) on the fifth surface C1 of the body 110 may protrude from the surrounding dielectric layer 111, and may be connected to the first external electrode 161 (the first electrode layer 131).

In the description below, the structure/shape of the internal electrodes 121 and 122 will be described in detail with reference to FIGS. 6 to 8.

Figure 6:
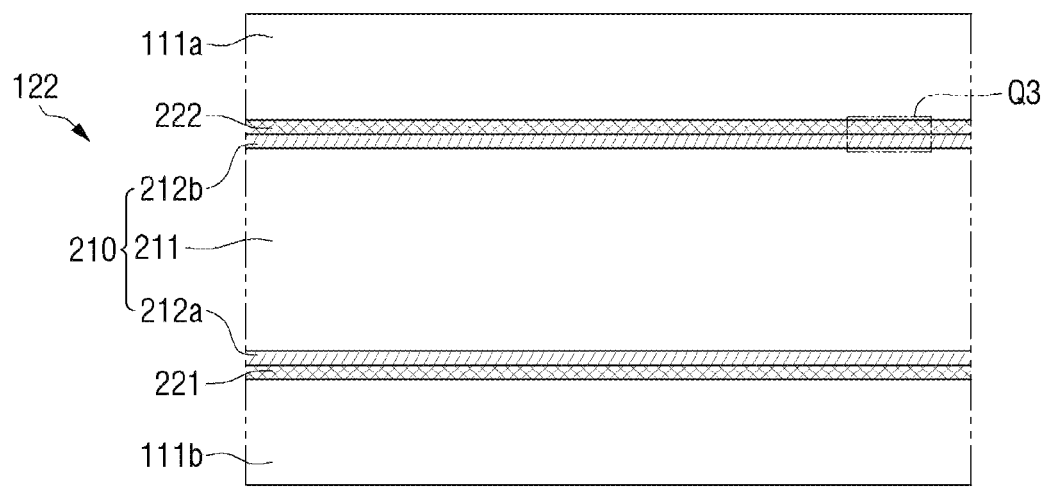
FIG. 6 is an enlarged diagram illustrating region Q1 in FIG. 4.
Figure 7:
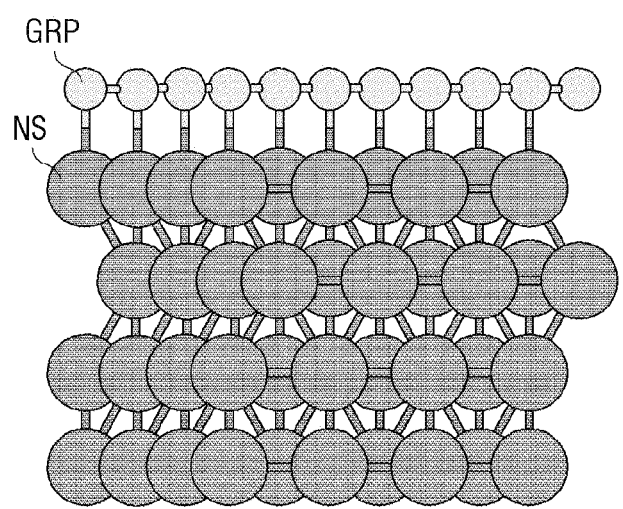
FIG. 7 is a diagram illustrating region Q3 in FIG. 6.

FIG. 6 is an enlarged diagram illustrating region Q1 in FIG. 4. FIG. 7 is a diagram illustrating region Q3 in FIG. 6. Although not described in detail, the structure/shape of the first internal electrode 121 may be substantially the same as the structure/shape of the second internal electrode 122.

Referring to FIG. 6, the second internal electrode 122 may be disposed between the corresponding dielectric layers 111a and 111b. The second internal electrode 122 may include a metal layer 210, a first graphene layer 221, and a second graphene layer 222.

The metal layer 210 may include Ni and Sn. Ni may be a main component of the second internal electrode 122, and Sn may improve reliability (high temperature load lifespan) of the second internal electrode 122.

The metal layer 210 may include a core region 211 and edge regions 212a and 212b. The core region 211 may be mainly formed of Ni, and the edge regions 212a and 212b may be mainly formed of a Ni—Sn alloy.

The first graphene layer 221 may be formed on a lower surface of the metal layer 210 of the second internal electrode 122, and the second graphene layer 222 may be formed on an upper surface of the metal layer 210. In one example, the first graphene layer 221 may be formed on an entire lower surface of the metal layer 210 of the second internal electrode 122, and the second graphene layer 222 may be formed on an entire upper surface of the metal layer 210.

The first graphene layer 221 may be disposed below the metal layer 210, and the second graphene layer 222 may be disposed on the metal layer 210. As illustrated, the first edge region 212a and the first graphene layer 221 may be formed to be directly in contact with each other. The second edge region 212b may be formed to be directly in contact with the second graphene layer 222. A portion of the Ni—Sn alloy layer of the first edge region 212a may be bonded to the first graphene layer 221. Similarly, a portion of the Ni—Sn alloy layer of the second edge region 212b may be bonded to the second graphene layer 222. In other words, as illustrated in FIG. 7, the Ni—Sn alloy layer NS may be bonded to the graphene layer GRP (carbon atoms).

The Sn content (the number of atoms) in a core region 211 may be different from the Sn content (the number of atoms) in the edge regions 212a and 212b. In other words, the Sn content of the core region 211 may be smaller than the Sn content of the edge regions 212a and 212b. Sn may diffuse at high temperatures. Therefore, during the process (for example, during baking), Sn may diffuse from the inside of the metal layer 210 to the outside, but Sn may be blocked by the graphene layers 221 and 222 formed on the upper and lower surfaces of the metal layer 210 and may be trapped in the metal layer 210. Accordingly, the Sn content in the edge regions 212a and 212b adjacent to a boundary between the metal layer 210 and the graphene layers 221 and 222 may increase. Ni—Sn alloy layers may be formed in the edge regions 212a and 212b.

Also, since the graphene layers 221 and 222 prevent Sn from being diffused into the dielectric layers 111a and 111b, reduction in capacitance caused by diffusion of Sn into the dielectric layers 111a and 111b may be prevented.

Also, to trap Sn in the metal layer 210, the graphene layers 221 and 222 may need to be formed on both the upper and lower surfaces of the metal layer 210. For example, when a graphene layer is disposed on the upper surface of the metal layer 210 and there is no graphene layer on the lower surface of the metal layer 210, Sn may diffuse into the dielectric layer through the lower surface of the metal layer 210. Therefore, when there is no graphene layer on the upper or lower surface of the metal layer 210, it may be difficult to prevent the reduction in capacitance.

Also, the graphene layers 221 and 222 opposing the dielectric layers 111a and 111b may improve connectivity of the second internal electrode 122, and the graphene layers 221 and 222 may contribute to improving smoothness of the second internal electrodes 222.

Figure 8:
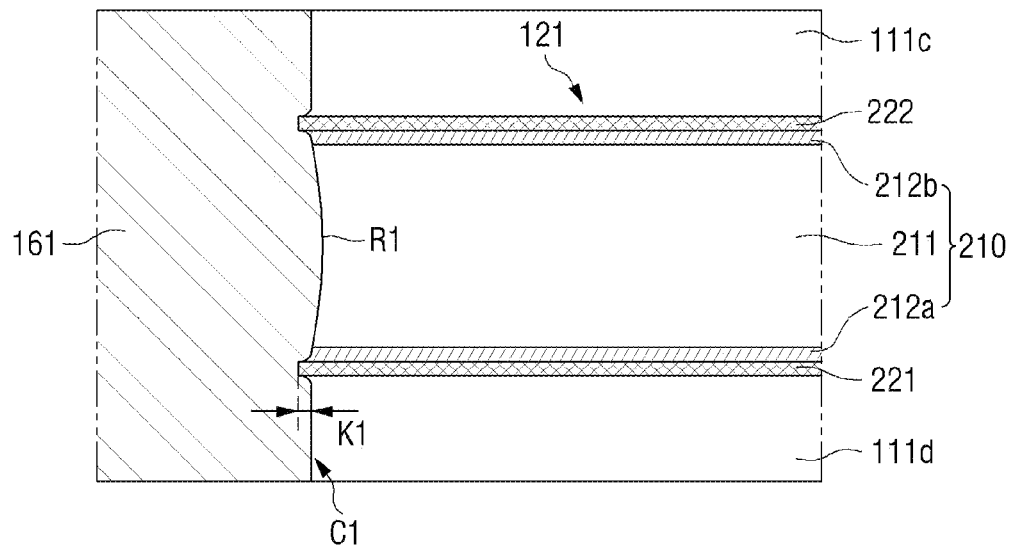
FIG. 8 is an enlarged cross-sectional diagram illustrating region Q2 in FIG. 4.

FIG. 8 is an enlarged cross-sectional diagram illustrating region Q2 in FIG. 4.

Referring to FIG. 8, the first internal electrode 121 may be in contact with the first external electrode 161 (the first electrode layer 131) through the fifth surface C1 of the body 110. In other words, the fifth surface C1 may be configured as a surface in which the first internal electrode 121 is exposed in the direction of the first external electrode 161.

A first graphene layer 221 may be formed on a lower surface of the first internal electrode 121 (e.g., a surface in contact with the dielectric layer 111d), and the second graphene layer 222 may be formed on an upper surface of the first internal electrode 121 (e.g., the surface in contact with the dielectric layer 111c).

On the fifth surface C1 of the body 110, the graphene layers 221 and 222 may protrude further than the dielectric layer 111c or 111d (see reference numeral K1) and may be in contact with the first external electrode 161.

The process of manufacturing the electronic component may include a polishing process. The polishing process is a process of rounding a sharp side surface of the body 110 to be easily connected to the external electrodes 161 and 162. Since strength of the graphene layers 221 and 222 is stronger than that of the dielectric layers 111c or 111d, the graphene layers 221 and 222 may be polished less than the dielectric layers 111c or 111d in the polishing process. Accordingly, the graphene layers 221 and 222 may protrude from the dielectric layers 111c or 111d.

Since the graphene layers 221 and 222 protrude, a contact area between the first internal electrode 121 and the first external electrode 161 may increase, and contact resistance may decrease.

Also, since strength of the graphene layers 221 and 222 is stronger than that of the metal layer 210, the graphene layers 221 and 222 may be polished less than the metal layer 210 in the polishing process. Accordingly, the graphene layers 221 and 222 may protrude further than the metal layer 210. Accordingly, a recess R1 configured to be recessed further than the graphene layers 221 and 222 may be formed in the metal layer 210 on the fifth surface C1. When the graphene layers 221 and 222 are present, a depth of the recess R1 is less than a depth of the recess of when there is no graphene layer. That is because, since the graphene layers 221 and 222 are present on both side surfaces of the metal layer 210, the metal layer 210 may be exposed relatively less (than the example in which the graphene layers are not present) in the polishing process, and may thus be less polished.

When the recess is formed deep in the polishing process, since the first external electrode 161 may not completely fill the deeply formed recess, resistance between the first internal electrode 121 and the first external electrode 161 may increase.

As illustrated in FIG. 8, since the depth of the recess R1 of when the graphene layers 221 and 222 are present is shallow, the recess R1 may be sufficiently filled with the first external electrode 161. Accordingly, the contact area between the first internal electrode 121 and the first external electrode 161 may increase, and contact resistance may decrease.

Figure 9:
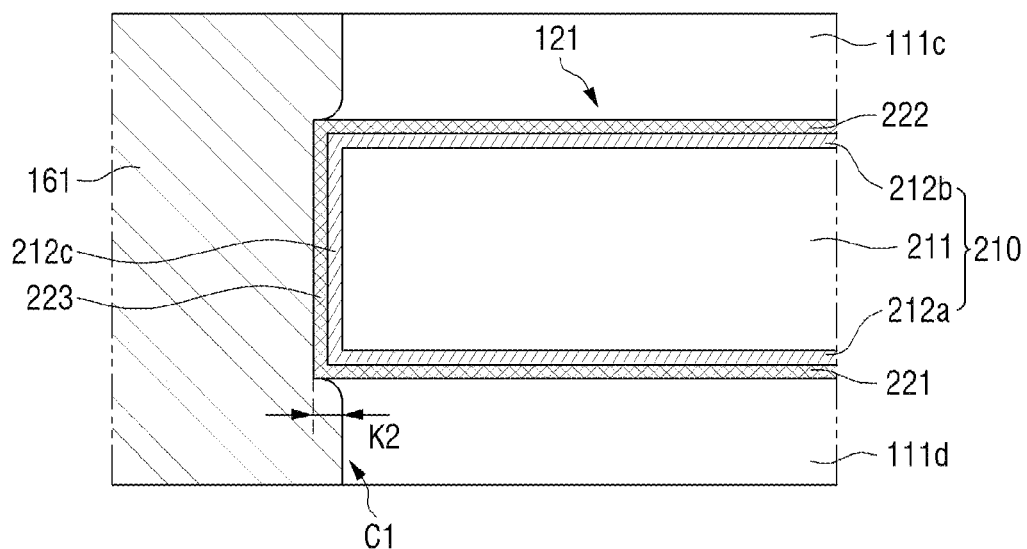
FIG. 9 is a diagram illustrating an electronic component according to a second example embodiment.

FIG. 9 is a diagram illustrating an electronic component according to a second example embodiment. In the description below, differences from the example described with reference to FIGS. 1 to 8 will be mainly described.

In the electronic component 100 according to the first example embodiment, as illustrated in FIG. 8, the graphene layer may be formed on the lower and upper surfaces of the metal layer 210, and may not be formed on the side surface of the metal layer 210.

In the electronic component 101 according to the second example embodiment, as illustrated in FIG. 9, the graphene layer 221, 222, and 223 may be formed on a lower surface and an upper surface of the metal layer 210 and on a side surface of the metal layer 210. The side surface may connect the upper and lower surfaces to each other.

Specifically, the first graphene layer 221 may be disposed on the lower surface of the metal layer 210, the second graphene layer 222 may be disposed on the upper surface of the metal layer 210, and the third graphene layer 223 may be disposed on the side surface of the metal layer 210. As illustrated, the first edge region 212a and the first graphene layer 221 may be in direct contact with each other, the second edge region 212b and the second graphene layer 222 may be in direct contact with each other, and the edge region 212c and the first graphene layer 221 may be indirect contact with each other. The third graphene layer 223 may be connected to the first graphene layer 221 and the second graphene layer 222.

A portion of the Ni—Sn alloy layer of the first edge region 212a may be bonded to the first graphene layer 221, a portion of the Ni—Sn alloy layer of the second edge region 212b may be bonded to the second graphene layer 222, and a portion of the Ni—Sn alloy layer of the edge region 212c may be bonded to the third graphene layer 223.

On the fifth surface C1 of the body 110, the graphene layers 221, 222, and 223 may protrude further than the dielectric layer 111c or 111d (see reference numeral K2), and may be in contact with the first external electrode 161. Since the graphene layers 221, 222, and 223 protrude, a contact area between the first internal electrode 121 and the first external electrode 161 may increase, and contact resistance may decrease.

Also, radiation cracks may be reduced in a contact portion between the first internal electrode 121 and the first external electrode 161. This is because Ni of the first internal electrode 121 may not be exposed, such that the formation of NiO may be reduced. Since NiO has a larger volume than Ni, radiation cracks may be easily formed when a large amount of NiO is formed. By preventing the formation of NiO, radiation cracks may be reduced. Also, Cu included in the first external electrode 161 may be prevented from diffusing into the first internal electrode 121.

Although not illustrated, in the first internal electrode 121, the graphene layer may also be formed on a side surface among side surfaces of the metal layer 210 covered by the dielectric layer 111. Since the graphene layer is also formed on the side surfaces of the metal layer 210, Sn may be prevented from diffusing into the dielectric layer 111 through the side surface.

Figure 10:
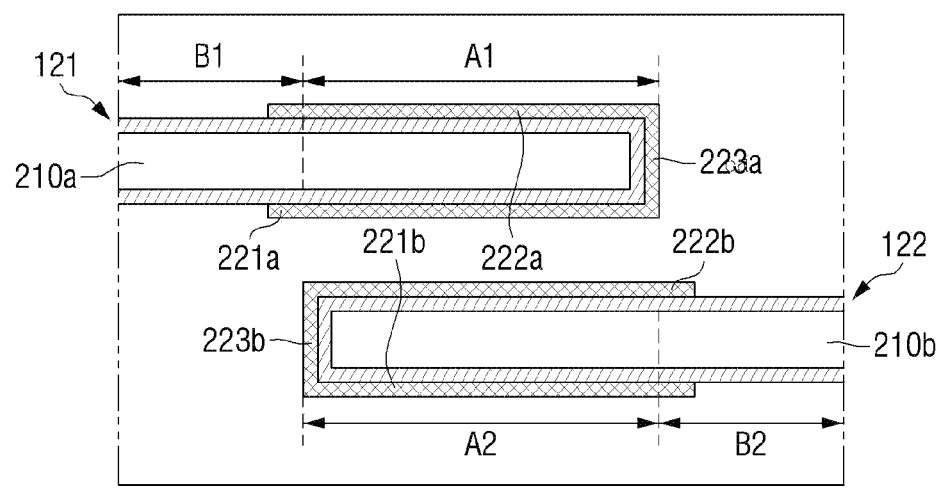
FIG. 10 is a diagram illustrating an electronic component according to a third example embodiment.

FIG. 10 is a diagram illustrating an electronic component according to a third example embodiment. In the description below, differences from the example described with reference to FIGS. 1 to 9 will be mainly described.

In the electronic component 100 according to the first example embodiment, as illustrated in FIG. 8, the graphene layers 221 and 222 may be formed on an entire lower surface and an entire upper surface of the metal layer 210 of the internal electrode 121 or 122.

Referring to FIG. 10, in the electronic component 102 according to the third example embodiment, graphene layers 221a, 222a, and 223a may be formed on a portion of the lower surface and/or a portion of the upper portion of the metal layer 210a of the first internal electrode 121. Graphene layers 221b, 222b, and 223b may be formed on a portion of the lower surface and/or a portion of the upper portion of the metal layer 210b of the second internal electrode 122.

Specifically, the first internal electrode 121 may include a first portion A1 and a second portion B1. The second internal electrode 122 may include a third portion A2 and a fourth portion B2.

The first portion A1 of the first internal electrode 121 and the third portion A2 of the second internal electrode 122 may overlap each other and may generate capacitance. The second portion B1 of the first internal electrode 121 and the third portion B2 of the second internal electrode 122 do not overlap with each other.

The graphene layers 221a, 222a, 221b, and 222b may be formed to cover portions (that is, A1 and A2) contributing to capacitance. The graphene layer may not be formed in at least a portion of portions (that is, B1 and B2) which do not contribute to capacitance.

Specifically, the graphene layer 221a may be formed on the lower surface of the first portion A1 of the first internal electrode 121, and the graphene layer 222a may be formed on the upper surface of the first portion A1. The graphene layer 221b may be formed on the lower surface of the third portion A2 of the second internal electrode 122 and the graphene layer 222b may be formed on the upper surface of the third portion A2.

It may be difficult to form a graphene layer on the entire lower surface and the entire upper surface of the metal layers 210a and 210b of the internal electrodes 121 or 122 in terms of the manufacturing process or design. In this case, a graphene layer may not be formed in a region irrespective of capacitance, that is, the second portion B1 of the first internal electrode 121 and the fourth portion B2 of the second internal electrode 122. However, to secure a margin in the process, as illustrated, the graphene layers 221a and 222a may be formed on a portion of the second portion B1, and the graphene layers 221b and 222b may be formed on a portion of the fourth portion B2.

Additionally, the graphene layer 223a may be formed on the side surface of the first portion A1 of the first internal electrode 121, and the graphene layer 223b may be on the side surface of the third portion A2 of the second internal electrode 122. Since the graphene layers 223a and 223b are formed on the side surfaces of the first internal electrode 121 and the second internal electrode 122, Sn of the metal layers 210a and 210b may be prevented from diffusing out of the metal layers 210a and 210b (to the dielectric layer 111).

Figure 11:
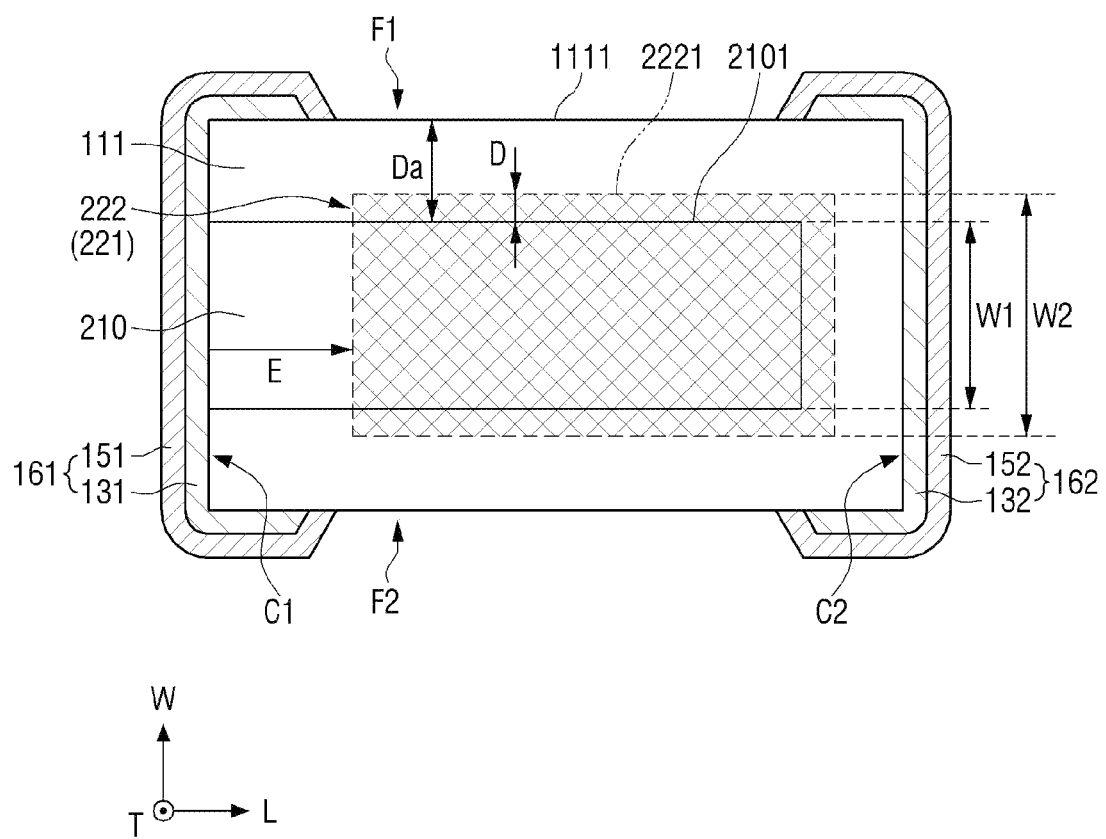
FIG. 11 is a plan diagram illustrating an electronic component according to a fourth example embodiment.

FIG. 11 is a plan diagram illustrating an electronic component according to a third example embodiment. In the description below, differences from the example described with reference to FIGS. 1 to 10 will be mainly described. In FIG. 11, to describe the relationship between the metal layer 210 and the graphene layers 221 and 222, the boundary of the metal layer 210 is represented by a solid line and the boundary of the graphene layers 221 and 222 is represented by a dotted line.

Referring to FIG. 11, in the electronic component 103 according to the fourth example embodiment, the first graphene layer 221 may be formed on the lower surface of the metal layer 210, and the second graphene layer 222 may be formed on the upper surface. The width W2 of the first graphene layer 221 or the second graphene layer 222 in the second direction W may be greater than the width W1 of the metal layer 210 in the second direction W. The width W2 of the first graphene layer 221 and the width W2 of the second graphene layer 222 are illustrated to be substantially the same, but an example embodiment thereof is not limited thereto.

The first side surface 2101 of the metal layer 210, the second side surface 2221 of the first graphene layer 221 or the second graphene layer 222, and the third side surface 1111 of the dielectric layer 111 may be parallel to each other in the first direction L. When a distance from the first side surface 2101 to the third side surface 1111 is defined as Da, and the distance from the first side surface 2101 to the second side surface 2221 is defined as D, Da and D may satisfy 0<D≤Da/2.

When the distance D is greater than 0, the first graphene layer 221 or the second graphene layer 222 may be formed to cover the side surface 2101 of the metal layer 210. Accordingly, Sn may be prevented from diffusing into the dielectric layer 111 through the side surface of the metal layer 210.

The reason why the distance D is controlled to be equal to or smaller than Da/2 is to secure a process margin such that the first graphene layer 221 or the second graphene layer 222 may not be exposed in the direction of the third surface F1 or the fourth surface F2 of the body 110.

Also, the first graphene layer 221 or the second graphene layer 222 may not be exposed to the fifth surface C1 of the body 110, and may be spaced apart from the fifth surface C1 by a predetermined distance E. Accordingly, the graphene layers 221 and 222 may be formed to cover only a portion of the metal layer 210 which may contribute to capacitance.

Figure 12:
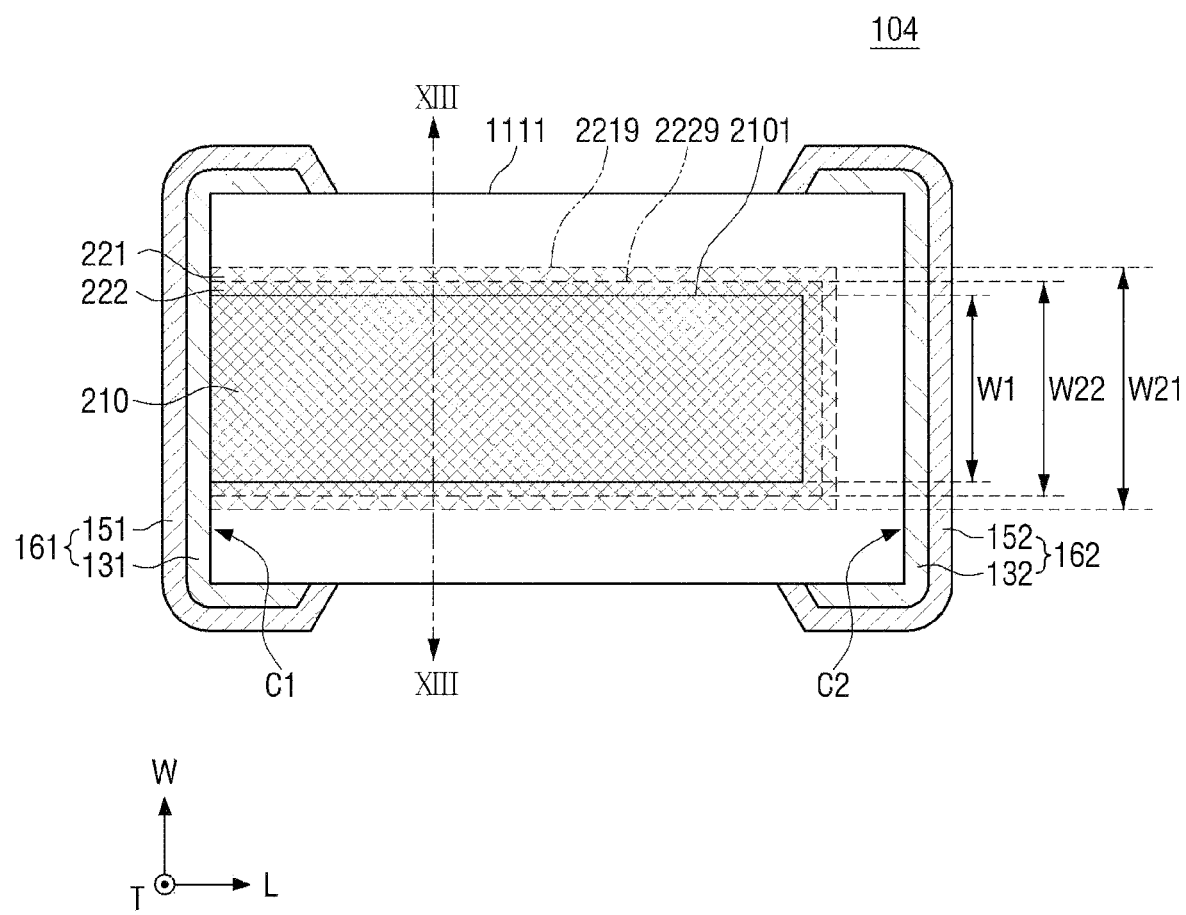
FIG. 12 is a plan diagram illustrating an electronic component according a fifth example embodiment.
Figure 13:
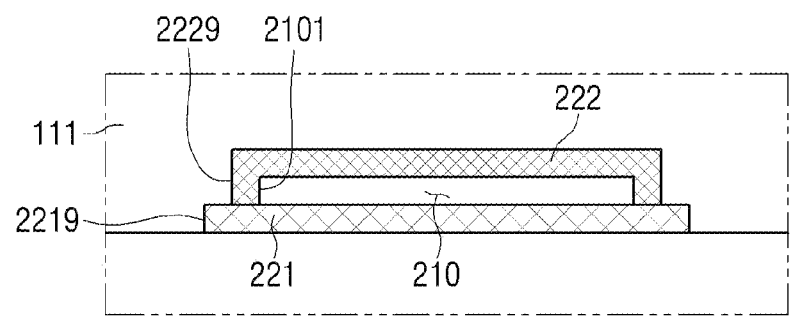
FIG. 13 is a cross-sectional diagram taken along XIII-XIII in FIG. 12.

FIG. 12 is a plan diagram illustrating an electronic component according a third example embodiment. FIG. 13 is a cross-sectional diagram taken along line XIII-XIII in FIG. 12.

In the description below, differences from the example described with reference to FIGS. 1 to 11 will be mainly described. In FIG. 12, to describe a relationship between the metal layer 210 and the graphene layers 221 and 222, the boundary of the metal layer 210 is represented by a solid line, and the boundary of the graphene layers 221 and 222 is represented by a dotted line.

Referring to FIGS. 12 and 13, in the electronic component 104 according to the fifth example embodiment, a first graphene layer 221 may be formed on the lower surface of the metal layer 210, and a second graphene layer 222 may be formed on the upper surface 222. A width W21 of the first graphene layer 221 in the second direction W may be greater than a width W22 of the second graphene layer 222 in the second direction W, and a width W22 of the second graphene layer 222 in the second direction W may be greater than the width W1 of the metal layer 210 in the second direction W.

Although it will be described later with reference to FIGS. 14 to 17, to manufacture an electronic component, the first graphene layer 221, the metal layer 210, and the second graphene layer 222 may be sequentially formed on a ceramic green sheet. In consideration of a process margin, the width W21 of the first graphene layer 221 may be determined to be the largest, and the width W1 of the metal layer 210 may be determined to be smaller than the width W21 of the first graphene layer 221, thereby forming the metal layer 210 on the first graphene layer 221. In other words, a space between the side surface 2219 of the first graphene layer 221 in the second direction W and the side surface 2101 of the metal layer 210 in the second direction W may be secured. Accordingly, when the second graphene layer 222 is formed on the metal layer 210, the second graphene layer 222 may be formed conformally along the upper and side surfaces 2101 of the metal layer 210 and the upper surface of the first graphene layer 221. Therefore, since the upper, lower, and side surfaces of the metal layer 210 may be covered by the graphene layers 221 and 222, it may be difficult for Sn in the metal layer 210 to diffuse into the dielectric layer.

Figure 14:
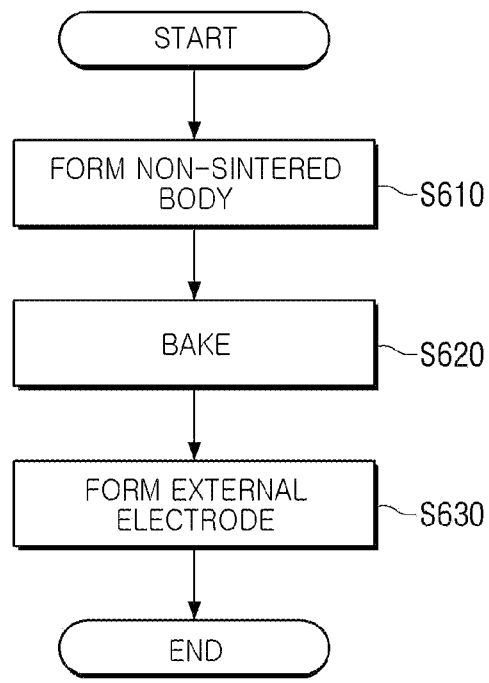
FIG. 14 is a flowchart illustrating a method of manufacturing an electronic component according to an example embodiment.
Figure 15:
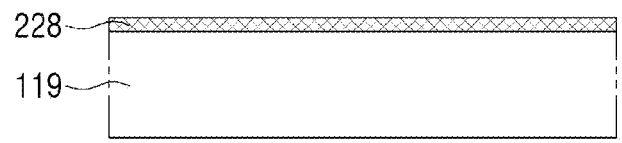
FIGS. 15 to 17 are diagrams illustrating process S610 in FIG. 16.
Figure 16:
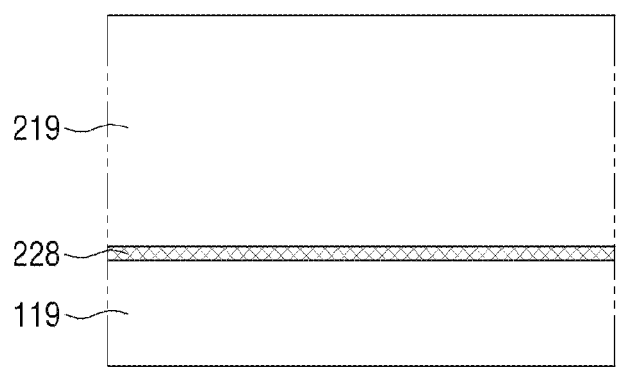
Figure 17:
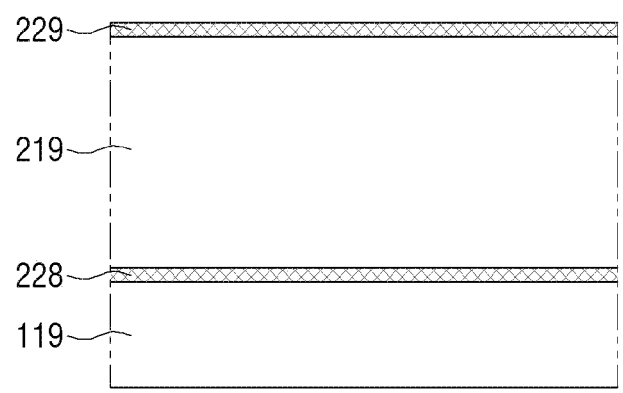

FIG. 14 is a flowchart illustrating a method of manufacturing an electronic component according to an example embodiment. FIGS. 15 to 17 are diagrams illustrating process S610 in FIG. 16.

Referring to FIG. 14, a non-sintered body may be formed (S610).

Specifically, as illustrated in FIG. 15, a ceramic green sheet 119 may be prepared, and graphene 228 may be formed on the ceramic green sheet 119 by deposition, spraying, or printing. Thereafter, as illustrated in FIG. 16, a paste 219 including Ni and Sn may be formed on the graphene 228 using a printing method such as a screen-printing method or a gravure printing method. Thereafter, as illustrated in FIG. 17, a graphene layer 229 may be formed on the paste 219 by deposition, spraying, or printing. Accordingly, a laminate of the graphene 228/the paste 219/the graphene 229 may be formed on the ceramic green sheet 119.

The plurality of ceramic green sheets 119 on which the graphene 228/the paste 219/the graphene 229 are formed may be laminated. The laminated ceramic green sheet 119 and the graphene 228/the paste 219/the graphene 229 may be compressed together by pressing in the lamination direction.

The laminates compressed with each other may be cut for each region corresponding to the body of a single multilayer capacitor, thereby completing the non-sintered body.

Referring back to FIG. 14, a binder may be burned by performing a heat treatment on the non-sintered body and may be baked in a reducing atmosphere, thereby obtaining a sintered body (S620). By sintering the graphene 228/the paste 219/the graphene 229, an internal electrode (for example, 121) including a first graphene layer 221/a metal layer 210/a second graphene layer 222 may be formed.

External electrodes may be formed on both end surfaces of the body (S630). The external electrode may include an electrode layer and a Ni/Sn plating layer on the electrode layer using, for example, a copper paste including glass.

According to the aforementioned example embodiments, the internal electrode of the electronic component may include a metal layer including Ni and Sn, and a graphene layer formed on the boundary of the metal layer. The graphene layer may contribute to securing target capacitance by improving connectivity of the internal electrodes. Also, the graphene layer may trap Sn in the metal layer such that Sn may be prevented from diffusing to the dielectric layer. Accordingly, a decrease in capacitance caused by diffusion of Sn into the dielectric layer may be prevented.

While the example embodiments have been illustrated and described above, it will be apparent to those skilled in the art that modifications and variations could be made without departing from the scope of the present invention as defined by the appended claims.

What is claimed is:

1. An electronic component, comprising:
a plurality of dielectric layers; and
a plurality of first internal electrodes and a plurality of second internal electrodes alternately disposed with a corresponding dielectric layer interposed therebetween,
wherein one of the plurality of first internal electrodes includes a metal layer containing Ni and Sn, a first graphene layer disposed on a lower surface of the metal layer, and a second graphene layer disposed on an upper surface of the metal layer,
wherein the metal layer includes a core region, a first edge region arranged between the first graphene layer and the core region, and a second edge region arranged between the second graphene layer and the core region,
wherein each of the first and second edge regions has a higher Sn content than the core region, and
wherein the first and second edge regions directly contact the first and second graphene layers, respectively.

2. The electronic component of claim 1, wherein the metal layer includes:
a first Ni—Sn alloy layer bonded to the first graphene layer in a region in contact with the first graphene layer, and
a second Ni—Sn alloy layer bonded to the second graphene layer in a region in contact with the second graphene layer.

3. The electronic component of claim 1,
wherein the one of the plurality of first internal electrodes includes a first portion overlapping one of the plurality of the second internal electrodes and contributing to capacitance, and a second portion not overlapping the one of the plurality of second internal electrodes, and
wherein the first graphene layer or the second graphene layer covers the first portion.

4. The electronic component of claim 3, wherein the first graphene layer or the second graphene layer is spaced apart from the second portion or covers only a portion of the second portion.

5. The electronic component of claim 1,
wherein a side surface of the metal layer connects the upper surface and the lower surface of the metal layer, and
wherein the first internal electrode further includes a third graphene layer disposed on the side surface of the metal layer and connected to the first graphene layer and the second graphene layer.

6. The electronic component of claim 1,
wherein a body includes the plurality of dielectric layers and the plurality of first and second internal electrodes,
wherein the electronic component further comprises an external electrode disposed on one surface of the body,
wherein the one of the plurality of first internal electrodes is in contact with the external electrode through the one surface of the body, and
wherein the first graphene layer or the second graphene layer protrudes further than the dielectric layer and is in contact with the external electrode on the one surface of the body.

7. The electronic component of claim 6, wherein the metal layer includes a recess in contact with the external electrode.

8. The electronic component of claim 1, wherein a first width of the first graphene layer is different from a second width of the second graphene layer.

9. The electronic component of claim 1, wherein a first width of the first graphene layer is greater than a third width of the metal layer.

10. The electronic component of claim 9,
wherein a first side surface of the metal layer, a second side surface of the first graphene layer or the second graphene layer, and a third side surface of the dielectric layer are parallel to each other, and
wherein, $0<D\leq Da/2$, in which Da is a distance from the first side surface to the third side surface, and D is a distance from the first side surface to the second side surface.

11. An electronic component, comprising:
a body including a plurality of dielectric layers, and a plurality of first internal electrodes and a plurality of second internal electrodes alternately disposed with a corresponding dielectric layer interposed therebetween;
a first external electrode in contact with the plurality of first internal electrodes through one surface of the body; and
a second external electrode in contact with the plurality of second internal electrodes through the other surface of the body,
wherein one of the plurality of first internal electrodes includes a metal layer, a first graphene layer disposed on a lower surface of the metal layer, and a second graphene layer disposed on an upper surface of the metal layer, and
wherein the first graphene layer or the second graphene layer protrudes further than the metal layer on one surface of the body.

12. The electronic component of claim 11, wherein the metal layer includes a recess in contact with the first external electrode.

13. The electronic component of claim 11,
wherein the first internal electrode includes a first portion overlapping the second internal electrode and contributing to capacitance, and a second portion not overlapping the second internal electrode, and
wherein the first graphene layer or the second graphene layer covers the first portion.

14. The electronic component of claim 13, wherein the first graphene layer or the second graphene layer is spaced apart from the second portion or covers only a portion of the second portion.

15. The electronic component of claim 11, wherein a first width of the first graphene layer is different from a second width of the second graphene layer.

16. The electronic component of claim 11, wherein the first width of the first graphene layer is greater than a third width of the metal layer.

17. The electronic component of claim 16,
wherein a first side surface of the metal layer, a second side surface of the first graphene layer or the second graphene layer, and a third side surface of the dielectric layer are parallel to each other, and
wherein $0<D\leq Da/2$, in which Da is a distance from the first side surface to the third side surface, and D is a distance from the first side surface to the second side surface.

18. A method of manufacturing an electronic component, the method comprising:
forming a non-sintered body including a plurality of non-sintered dielectric layers and a plurality of non-sintered internal electrodes; and,
forming a sintered body by baking the non-sintered body to form a sintered internal electrode, from among the plurality of non-sintered internal electrodes, which includes a metal layer containing Ni and Sn, a first graphene layer disposed on a lower surface of the metal layer, and a second graphene layer disposed on an upper surface of the metal layer,
wherein the forming a non-sintered body includes forming a first graphene on the green sheet, applying a paste including Ni and Sn on the first graphene, and forming a second graphene on the paste,
wherein the metal layer includes a core region, a first edge region arranged between the first graphene layer and the core region, and a second edge region arranged between the second graphene layer and the core region,
wherein each of the first and second edge regions has a higher Sn content than the core region, and
wherein the first and second edge regions directly contact the first and second graphene layers, respectively.

19. The method of claim 18, wherein the metal layer of the sintered body includes:
a first Ni—Sn alloy layer bonded to the first graphene layer in a region in contact with the first graphene layer, and
a second Ni—Sn alloy layer bonded to the second graphene layer in a region in contact with the second graphene layer.

* * * * *